(12) United States Patent
Lawrence, Jr.

(10) Patent No.: US 6,896,069 B2
(45) Date of Patent: May 24, 2005

(54) ROLL-OVER DISK PLOW

(76) Inventor: Ventura J. Lawrence, Jr., 2343 Canyon Creek Dr., Stockton, CA (US) 95207

( * ) Notice: Subject to any disclaimer, the term of this patent is extended or adjusted under 35 U.S.C. 154(b) by 0 days.

(21) Appl. No.: 10/463,198

(22) Filed: Jun. 16, 2003

(65) Prior Publication Data

US 2004/0256125 A1 Dec. 23, 2004

(51) Int. Cl.$^7$ ............................................ A01B 3/40
(52) U.S. Cl. ....................................................... 172/225
(58) Field of Search ............................... 172/204, 212, 172/219, 220, 224–227, 574, 603, 776

(56) References Cited

U.S. PATENT DOCUMENTS

| | | |
|---|---|---|
| 1,042,651 A | 10/1912 | Davis |
| 2,676,524 A | 4/1954 | Bashor |
| 2,777,373 A | 1/1957 | Pursche |
| 3,042,120 A | 7/1962 | Heckathorn |
| 3,101,789 A | 8/1963 | Jennings |
| 3,115,191 A | 12/1963 | Ward |
| 3,307,635 A | 3/1967 | Ward |
| 3,507,334 A | 4/1970 | Watts |
| 3,554,294 A | 1/1971 | Morkoski |
| 3,749,178 A | 7/1973 | Watts |
| 3,980,141 A | 9/1976 | Vest |
| 4,067,396 A | 1/1978 | Watts |
| 4,165,787 A | 8/1979 | Perkins |
| 4,207,951 A | 6/1980 | Wilcox et al. |
| 4,592,429 A | 6/1986 | Watts |
| 4,640,367 A | 2/1987 | Lawrence et al. |
| 4,687,065 A | 8/1987 | Cope et al. |
| 4,942,928 A | 7/1990 | Gomez |
| 5,097,908 A | 3/1992 | Kirch |
| 5,199,503 A | 4/1993 | Matsepuro et al. |
| 5,454,434 A | 10/1995 | Temple |
| 5,740,868 A | 4/1998 | Stangeland |

FOREIGN PATENT DOCUMENTS

| | | |
|---|---|---|
| DE | 2 419 119 | 4/1974 |
| FR | 1 268 430 | 6/1961 |

*Primary Examiner*—Robert E Pezzuto
(74) *Attorney, Agent, or Firm*—Townsend & Townsend & Crew LLP; Nathan S. Cassell (57) ABSTRACT

A base frame for a roll-over disc plow can be symmetrical about a longitudinal axis and can be adapted to be secured to a standard tractor hitch. A plow frame can overlay and be pivoted to the base frame about the longitudinal axis. The plow frame can be hydraulically moved about one hundred eighty degrees between extreme positions.

21 Claims, 11 Drawing Sheets

ROLL-OVER DISK PLOW

CROSS-REFERENCE TO RELATED APPLICATIONS

The present application is related to U.S. Pat. No. 4,640,367, issued Feb. 3, 1987, the entire disclosure of which is incorporated herein by reference for all purposes.

BACKGROUND OF THE INVENTION

This invention relates to farm implements, and in particular to devices pertaining to reversible or roll-over disc plows.

There is a continuing need for plows, particularly of the gang, disc plow nature, effective to make maximum use of the tractive effort of a tractor and to provide a well-prepared, uniform planting bed in the earth. While there have been a relatively large number of such devices manufactured and patented, there is still a need for such a plow that balances and effectively uses the tractive effort on the plow, is easy to maneuver and handle, and is easy to invert and return. What is more, as tractors are manufactured with increasingly greater horsepower capacities, there is a growing need for stronger and more durable plows that can withstand the substantial loads and drag forces that may be generated by such tractors.

BRIEF SUMMARY OF THE INVENTION

The present invention provides improved disc plow devices for working soil. In a first aspect, the roll-over disc plow can include a base frame having a leading beam and at least one side beam, a plow frame having a plow beam and a cross beam, and a plurality of plow discs coupled with the plow beam. The leading beam of the base frame can be rotationally coupled with the cross beam of the plow frame, and the at least one side beam of the base frame can be rotationally coupled with the plow beam of the plow frame. The cross beam can be configured such that when the plow is under a load, the cross beam can rest upon the at least one side beam and can flex rearwardly without laterally abutting the at least one side beam.

Relatedly, the leading beam of the base frame can be rotationally coupled with the cross beam of the plow frame via a forward journal, and the at least one side beam of the base frame can be rotationally coupled with the plow beam via a rearward journal. The plow may further include a rotating mechanism that rotates the plow frame about a longitudinal axis, for example, the longitudinal axis defined by the forward journal and the rearward journal. What is more, the rotating mechanism can include a first hydraulic mechanism and a second hydraulic mechanism. The first hydraulic mechanism can be adapted to move the cross beam from a first operating position toward an initial rotating position, and the second hydraulic mechanism can be adapted to move the cross beam from the initial rotating position toward a second operating position. The first hydraulic mechanism can have a first pair of hydraulic cylinders and pistons, and the second hydraulic mechanism can have a second pair of hydraulic cylinders and pistons. Relatedly, the first pair of hydraulic cylinders and pistons can be substantially vertically oriented, and the second pair of hydraulic cylinders and pistons can be substantially horizontally oriented.

In a further aspect, the plurality of plow discs can be coupled with the plow beam via a plurality of rotatable adjusting carriers. What is more, each rotatable adjustable carrier may have a flange spindle, a safety sleeve, and a bushing, such that the safety sleeve can be disposed about the flange spindle and the bushing can be disposed about the safety sleeve. Similarly, each rotatable adjusting carrier can be configured to provide a first clearance between an outer circumference of the flange spindle and an inner circumference of the safety sleeve, and a second clearance between an outer circumference of the safety sleeve and an inner circumference of the bushing. Moreover, each rotatable adjusting carrier can have a first bearing assembly comprising a first bearing cup and a first bearing cone, and a second bearing assembly comprising a first bearing cup and a first bearing cone. Each rotatable adjusting carrier is coupled with the plow beam via a plow disc mounting arm and two tubes.

In a related aspect, the plow frame can be coupled with a forward apex of a triangular member of a guide frame via a bracket and with a side edge of the triangular member of the guide frame via a turnbuckle adjuster. The turnbuckle adjuster can be selectively set so as to determine the orientation of a guide disc with reference to the plow frame.

In another aspect, the roll-over disc plow can include a base frame symmetrical in plan about a longitudinal axis and having a transverse leading beam and side beams merging with the ends of the leading beam. Further base frame can have a convergence rearwardly, a coaxial forward journal in the leading beam, and a coaxial rearward journal in the convergence. The disc plow can have a plow frame including a plow beam extending diagonally in plan across the axis and a cross beam adapted to flex rearwardly under load. Further, the disc plow can have means for mounting the plow frame in the forward journal and in the rearward journal, a plurality of plow discs arranged along and mounted on the plow beam, means interconnecting the plow frame and the base frame for rotating the plow frame about the axis and with respect to the base frame to lie in either of two extreme positions. The cross beam and the side beams can be configured such that when the plow is under load the cross beam can rest upon the side beam and flex rearwardly without laterally abutting the side beam.

Relatedly, the plow beam when in either of the extreme positions can be substantially symmetrical with the axis. A substantially flat upper surface of each side beam can be disposed beneath the cross beam such that the side beam does not directly laterally constrain movement of the cross beam when flexed in both of the extreme positions. What is more, the plow discs can be arranged on the plow beam in both of the extreme positions thereof with approximately half the number of the disc plows on one side of the axis and half the number of the disc plows on the other side of the axis.

The plow beam in transverse cross-section can have two laterally and outwardly directed side faces defining a dihedral angle, and some of the disc plows can be mounted on one of the side faces and others of the disc plows can be mounted on the other of the side faces, effectively positioning the plows more nearly under the plow beam than they would be were the plow beam provided with a single vertical, side face. Relatedly, the means for rotating the plow frame about the axis can include a crank pin on the plow frame adapted to rotate about the axis between two horizontally opposite extreme positions approximately one hundred eighty degrees apart, and can further include a pair of hydraulic cylinders and pistons for rotating the pin between the extreme positions. Still further, the rotating means can have an expansible means including a pair of auxiliary hydraulic cylinders and piston rods on the base frame and adapted to engage the plow frame only when the crank pin is substantially in either of the two extreme positions for urging said crank pin vertically partly out of the extreme positions.

In still another related aspect, the means for rotating the plow frame about the axis can include a crank pin on the plow frame adapted to rotate about the axis between the two extreme positions, and the extreme positions can be approximately one hundred eighty degrees apart and the rotating means can further include a hydraulic cylinder and piston mechanism connected to the base frame and the crank pin and movable into a straight locking position without crank effect, and an auxiliary hydraulic cylinder and plunger rod arrangement interposed between the base frame and the plow frame with the rod abutting said plow frame for urging the crank pin vertically partly out of one of the extreme positions.

For a fuller understanding of the nature and advantages of the present invention, reference should be had to the ensuing detailed description taken in conjunction with the accompanying drawings. The drawings represent embodiments of the present invention simply by way of illustration. The invention is capable of modification in various respects without departing from the invention. Accordingly, the drawings and description of these embodiments is illustrative in nature, and not restrictive.

DETAILED DESCRIPTION OF THE INVENTION

Figure 1A:
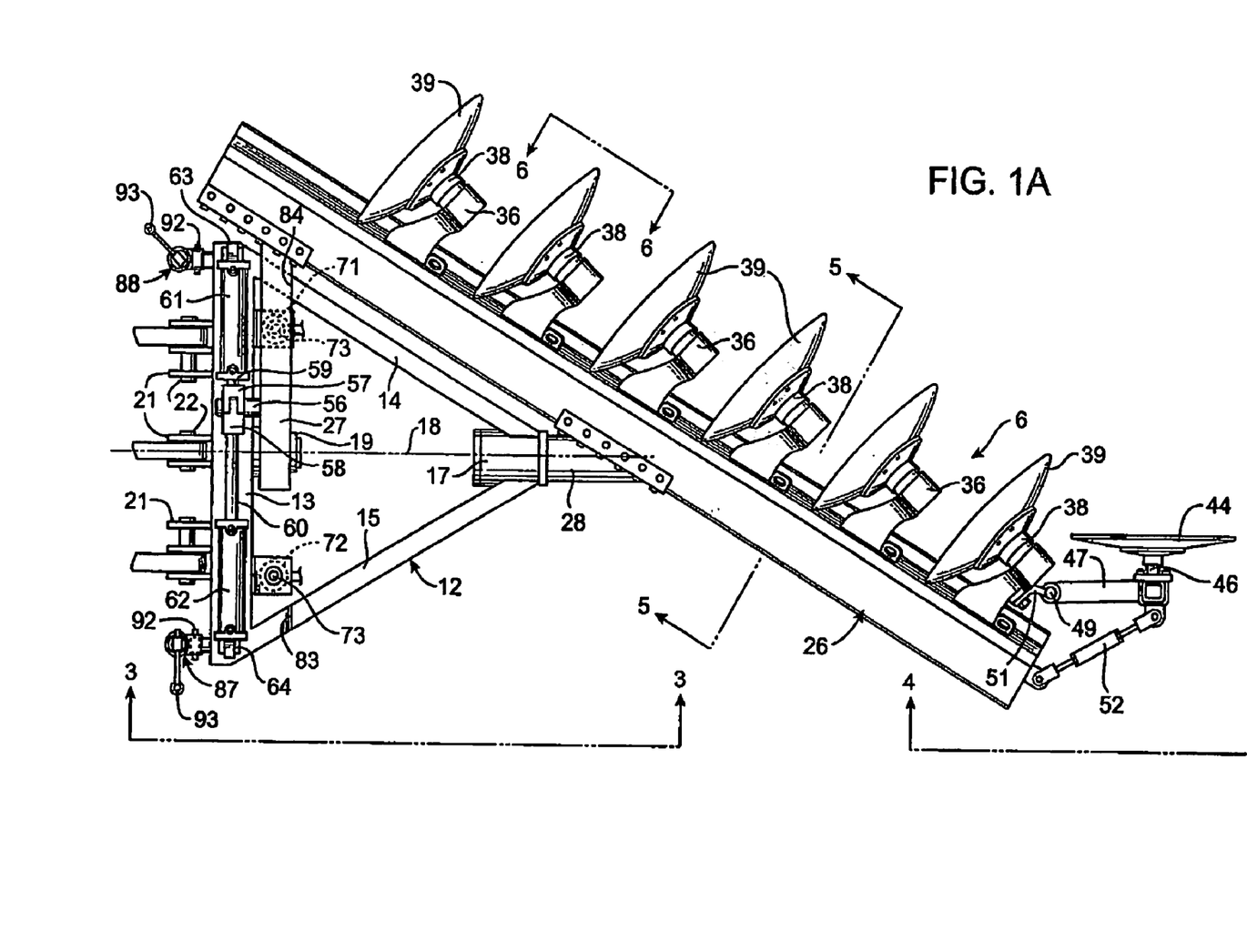
FIG. 1A is a plan of the device of the invention shown, certain portions of the associated structure being broken away to reduce the size of the figure.

Turning now to the drawings, FIG. 1A illustrates a disc plow 6 according the present invention. Disc plow 6 can include a base frame 12, which may be generally triangular in plan. Base frame 12 can be made up of structural members including a leading beam 13 extending transversely. Coupled with opposite ends of leading beam 13, there may be a pair of side beams 14 and 15 that converge in a rearward direction toward an area of convergence at which a rearward journal 17 may be disposed. Rearward journal 17 can be symmetrical about a longitudinal axis 18 on which also may be disposed a forward journal 19 incorporated with the leading beam 13.

Leading beam 13 may be provided with a number of attaching plates 21 designed to carry pins 22 for joining the plow structure to a standard three-point hitch of a tractor. United with base frame 12 for rotation about axis 18 through approximately one hundred eighty degrees, there may be a plow beam 26 disposed substantially symmetrically in plan with respect to axis 18. A cross beam 27 may be removably united with plow beam 26 and can be designed to rotate about axis 18 and on forward journal 19. A similar connector 28 may also be joined to plow beam 26 by detachable fastenings and may be rotatable in rearward journal 17 about axis 18. Plow beam 26 can be made detachable for ease in shipment.

Figure 1B:
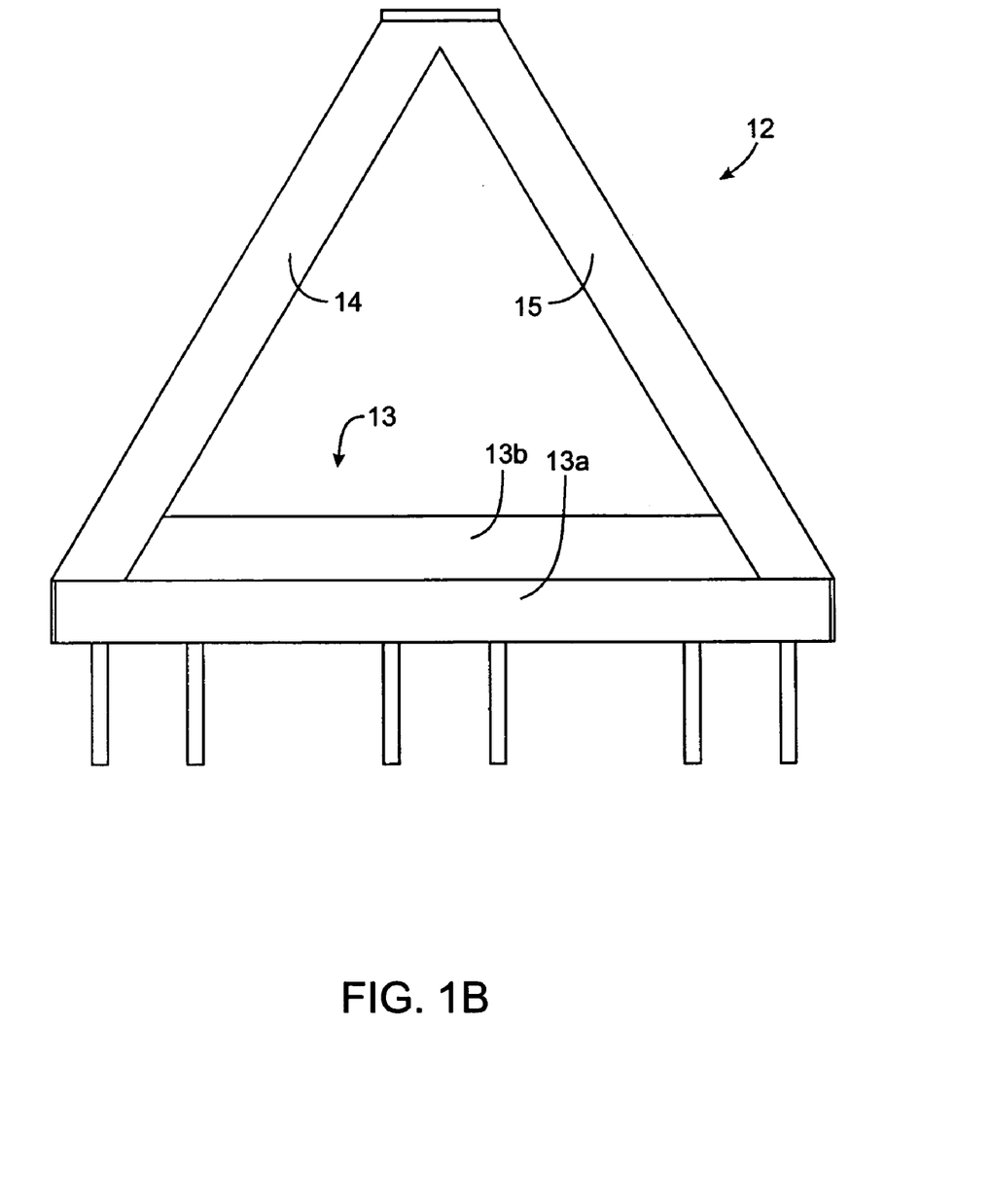
FIGS. 1B and 1C are top views of the base frame.
Figure 1C:
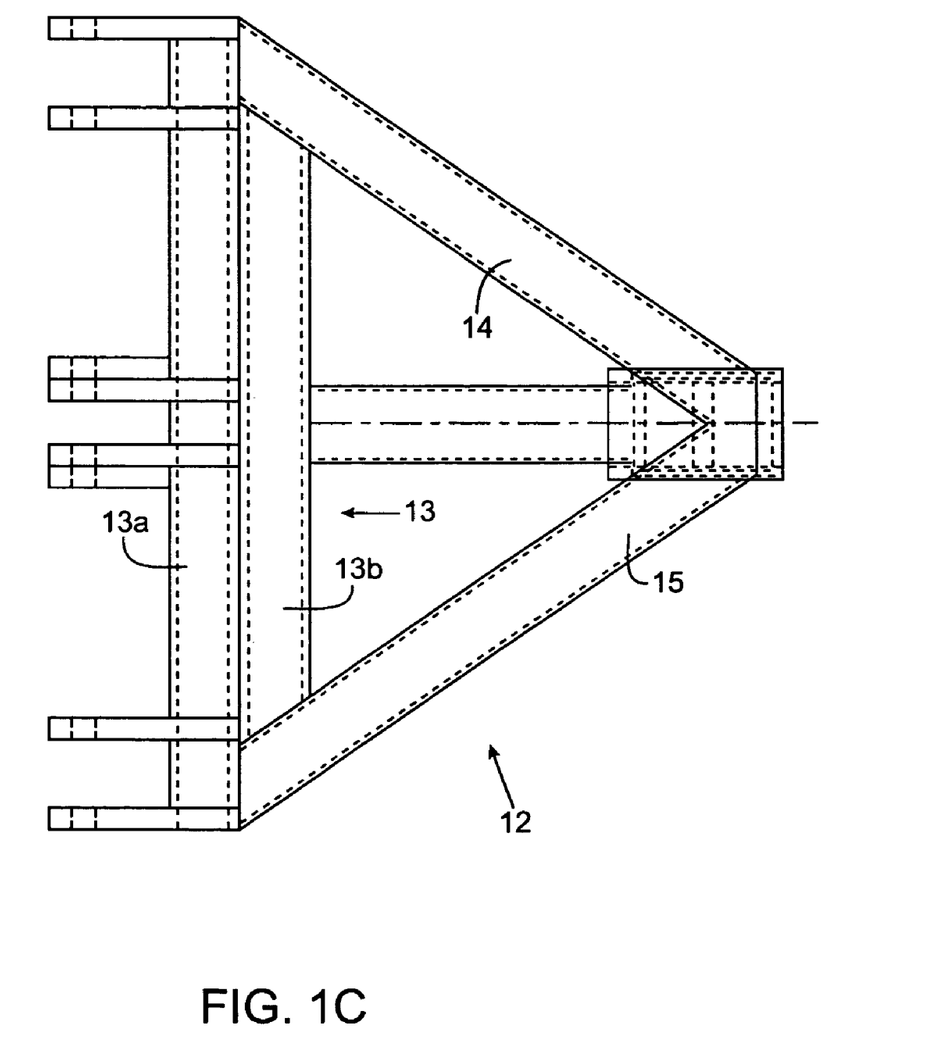

Because it may be intended that plow beam 26 be rotated about axis 18 from time to time, an appropriate hydraulic mechanism can be utilized for that purpose. As particularly illustrated in FIGS. 1A, 2 and 3, a cross beam 27 can be mounted on journal 19 and can carry an offset crank pin 56 extending forwardly over leading beam 13. Offset crank pin 56 can be engaged by the journalled ends 57 and 58 of a pair of hydraulic piston rods 59 and 60 each extending from a piston (not shown) reciprocable within a respective one of two hydraulic cylinders 61 and 62. At their remote ends, cylinders 61 and 62 can be connected through coplanar pivots 63 and 64 to base frame 12. As shown in FIGS. 1B and 1C, leading beam 13 can include two leading beam members 13a and 13b to provide additional structural integrity to base frame 12. Leading beam members 13a and 13b can have, for example, a substantially tubular 6"×4"×½" dimension, and be welded together.

Figure 2:
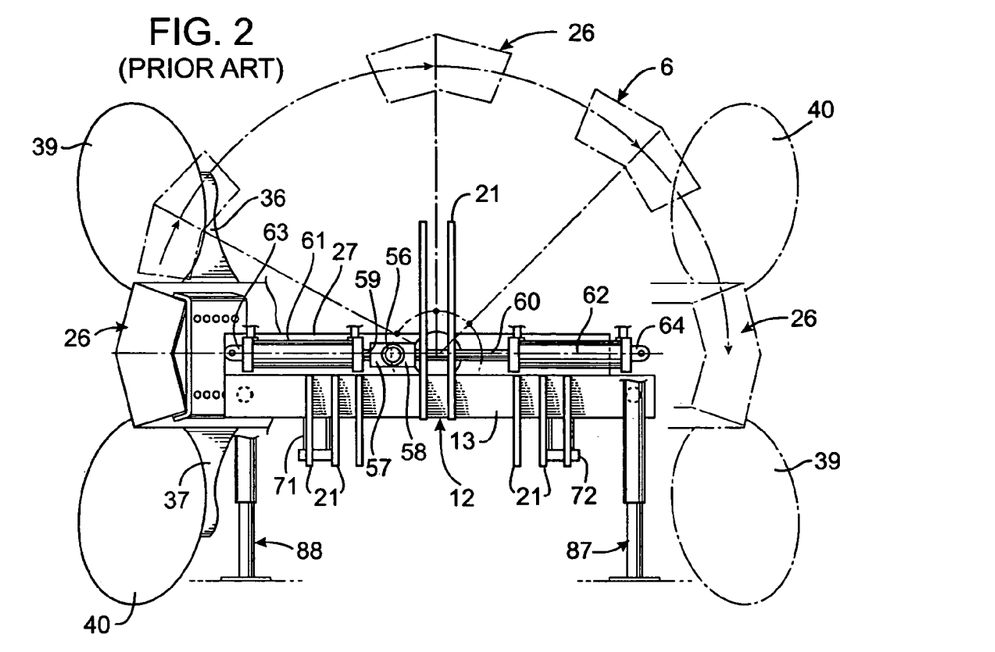
FIG. 2 is a front elevation of the plow structure looking rearwardly and showing in broken lines various positions of the plow mechanism in shifting from one extreme location to another.

As seen in FIG. 2, in two extreme positions of plow beam 26 with respect to the base frame 12, two piston rods 59 and 60 can be in straight, locking alignment and so have no crank effect. For this reason there may be provided on leading beam 13 at either side of the center thereof one of a pair of auxiliary cylinders 71 and 72. Auxiliary cylinders can be mounted on base frame 12 and can have upwardly extending plunger rods 73 adapted when projected to abut the adjacent underside of cross beam 27. When hydraulically actuated, plungers 73 can rise for a limited distance. The effective rod 73 can initially lift cross beam 27 to a point far enough away from a straight line, or central position so that two cylinders 61 and 62 can be fully effective. In this way, plow beam 26 can be pivoted about axis 18 from one position to another position approximately a half turn away from the initial location. This reversal or inversion in position of plow beam 26 and the associated plow discs 39 and 40 can be performed when tractor hitch 8 is in a sufficiently elevated location so that there is little or no ground interference with the rotation of the rearward portion of plow beam 26 and the rearward plow discs 39 and 40. The effect of the half turn can be to lift the momentarily lower rank of plow discs 40 into an upper position and to put the previously upper rank of plow discs 39 into a lower, plowing position, the guide discs 44 and 48 also being simultaneously inverted.

Figure 3A:
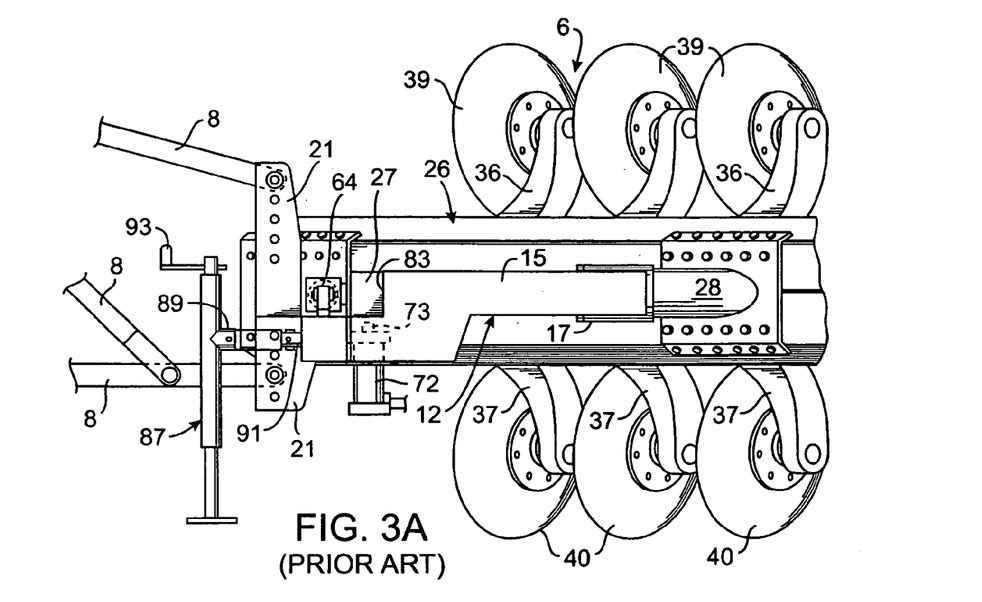
FIG. 3A is a side elevation, as indicated by the line 3—3 of FIG. 1A, with portions of the structure broken away to reduce the size of the figure.
Figure 3B:
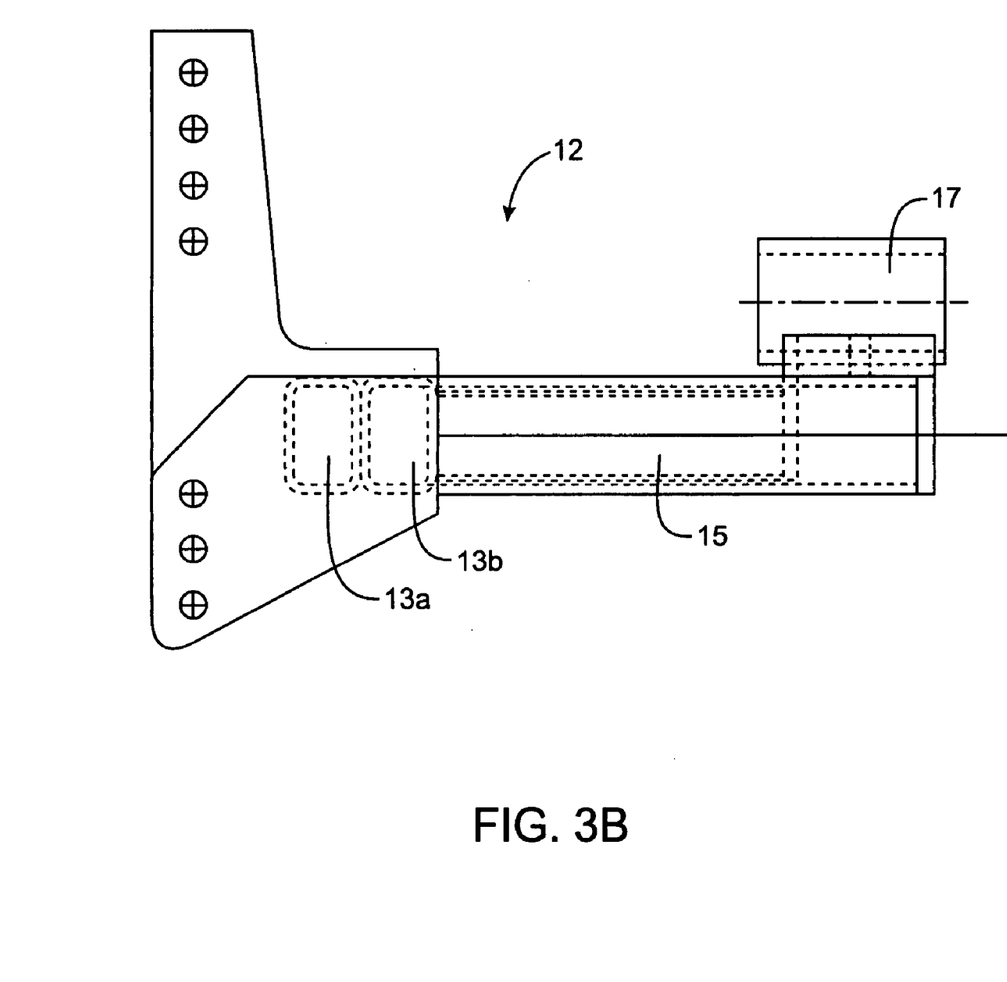
FIG. 3B is a side view of the base frame.

As depicted in FIG. 3A, the construction of cross beam 27 can be such that it comes, in two extreme positions, into very close relationship with upstanding steps 83 and 84 formed in the offset base frame side beams 14 and 15. The relationship may be such that while a light sliding engagement may be had when the parts are not loaded by the plowing stresses, the surfaces of cross beam 27 and of steps 83 and 84 may flex slightly to come into close abutting relationship during plowing. The plowing forces can be in part transmitted directly therethrough, thus relieving some of the plowing strain on journals 17 and 19. Since plow beam 26 is often inverted when the plowing operation has been discontinued, the interrelationship of steps 83 and 84 and of cross beam 27 may be such that they can be separated readily except during actual plowing operations. Alternatively, side beams 14 and 15 may be constructed to provide a more substantial gap between the rearward surface of cross beam 27 and steps 83 and 84, such that the close abutting relationship between cross beam 27 and steps 83 and 84 only occurs when the plow is subjected to more substantial plowing loads. The size of the gap can be adjusted such that the close abutting relationship occurs only at pre-determined plowing loads. Relatedly, steps 83 and 84 may include a deformable material or component that compresses under load. As shown in FIG. 3B, side beams 14 and 15 may be constructed such that they include a substantially flat upper surface, without steps. In an operational plowing configuration, cross beam 27 may be free to rest upon and slide across the substantially flat upper surface of side beams 14 and 15, or otherwise be unrestricted in lateral movement or flexion by the side beams. It will also be appreciated that although side beams 14 and 15 are described as two separate elements, base frame 12 may be constructed such that there is only one side beam having two surfaces that correlate to side beams 14 and 15.

Figure 4A:
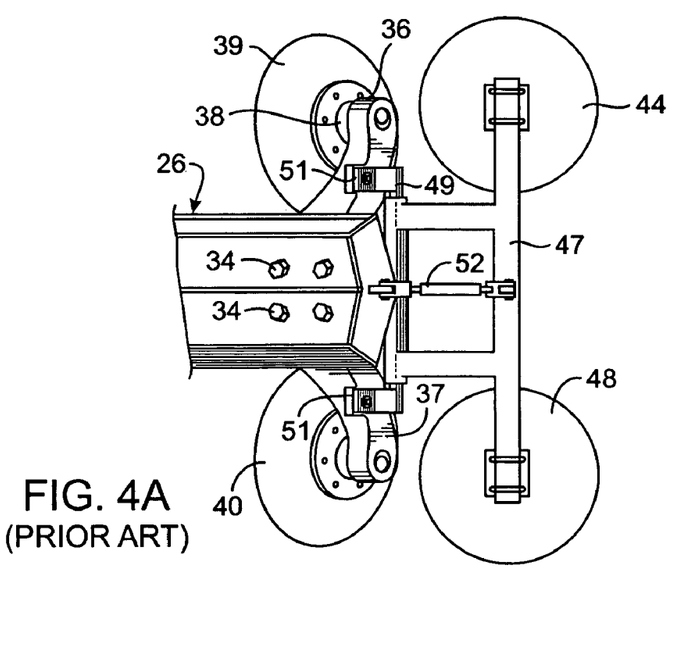
FIG. 4A is a side elevation comparable to FIG. 3A but showing a different part of the structure as indicated by the line 4—4 of FIG. 1A.
Figure 5:
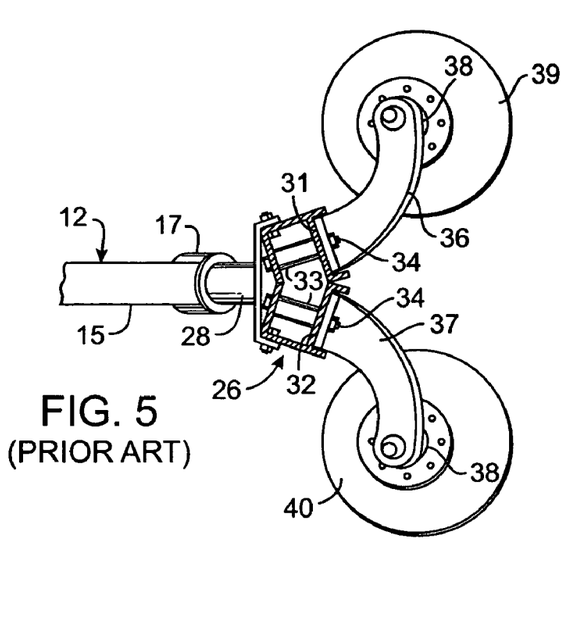
FIG. 5 is a cross-section, the plane of which is indicated by the line 5—5 of FIG. 1A.
Figure 6:
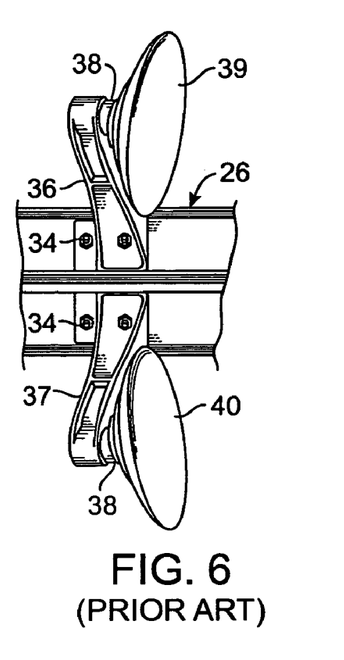
FIG. 6 is a view along the line 6—6 of FIG. 1A and with portions broken away showing the structure illustrated in FIG. 5.

As illustrated in FIGS. 4A, 5, and 6, plow beam 26 can be made of structural shapes and plates so as to afford a pair of laterally and outwardly directed surfaces or side faces 31 and 32 disposed out of the same plane and forming a dihedral angle with respect to each other. The shapes and plates can be reinforced by tubes 33 that receive fastenings 34 for holding in place plow disc mounting arms in two comparable gangs or sets 36 and 37. It will be understood that each plow disc mounting arms 36 and 37 can be coupled with plow beam 26 via one or more tubes 33. In some cases, two or more tubes 33 can be used to couple plow disc mounting arms 36 and 37 to plow beam 26, to provide additional structural support when the disc plow is under heavy plowing loads. What is more, tubes 33 can be constructed of selected alloys and sized so as to optimize this support function. Each arm 36 or 37 may be of a standard shape such as, for example, the shape shown U.S. Pat. No. 1,042,651 to Davis et al. The arms in each set 36 and 37 can include special, eccentrically rotatable adjusting carriers 38. Carriers 38 can receive and orient the rotary shafts of two sets of plow discs 39 and 40. The two sets of plow discs may alternate in use. While they are generally in vertical registry with each other, because of the dihedral angle of the faces 31 and 32 of the plow beam 26, the ground-engaging plow discs 39 and 40 may be positioned more nearly under plow beam 26 than they would be were plow beam 26 provided with a single vertical side face. This angular relationship can be effective in effectively imposing the plowing forces on the beam and in transmitting the plowing forces more nearly under the beam to reduce the lateral displacement or skewing forces thereon.

Plow discs 39 and 40 may be arranged at approximately evenly spaced intervals along the diagonal length of plow beam 26 and can be distributed along such length so that approximately half of the plow discs lie on one side of axis 18. Precise division may not necessarily be followed because there may be mounted at the trailing end of plow beam 26 a pair of guide discs 44 and 48 similar in nature to the plow discs 39 and 40 but substantially flat. As shown in FIG. 4A, guide discs 44 and 48 can be mounted in vertical registration for rotation on axles 46 carried in a guide frame 47. Guide frame 47 can be rotatable about a cross vertical shaft 49 secured by brackets 51 to the mounting arms 36 and 37 of the trailing plow discs. A turnbuckle adjuster 52 can be effective to orient the plane of the effective disc 44 or 48 with respect to the ground, so that residual side thrust from the operation of the associated gang or series of plow discs can be appropriately counteracted.

Figures 4B, 4C:
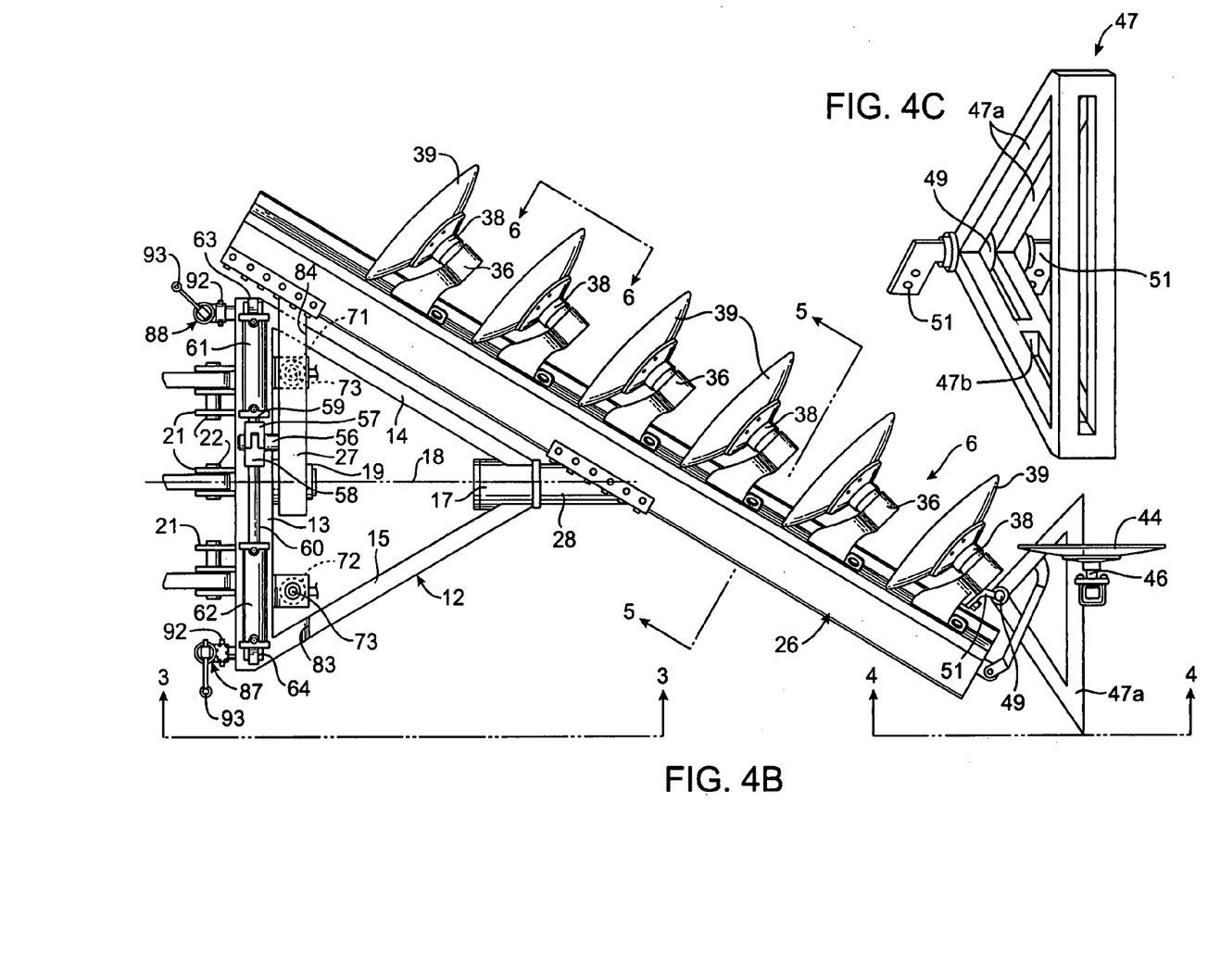
FIG. 4B is a top view of the disc plow.
FIG. 4C is a perspective view of the guide frame.

As illustrated in FIGS. 4B and 4C, guide frame 47 can alternately include at least one triangular member 47a. If guide frame 47 includes more than one triangular member 47a, the triangular members 47 can be coupled together via at least one support bar 47b. Guide frame 47 can be coupled with mounting arms 36 and 37 of trailing plow discs 39 and 40 via a pair of brackets 51 and can rotate about a cross vertical shaft 49. Turnbuckle adjuster 52 can be attached with plow beam 26 and guide frame 47, and adjusted as described above to selectively set the orientation of guide discs 44 and 48 as desired. The at least one triangular member 47a and the at least one support bar 47b can be made of 2"×2" square tubing, for example.

Figure 4D:
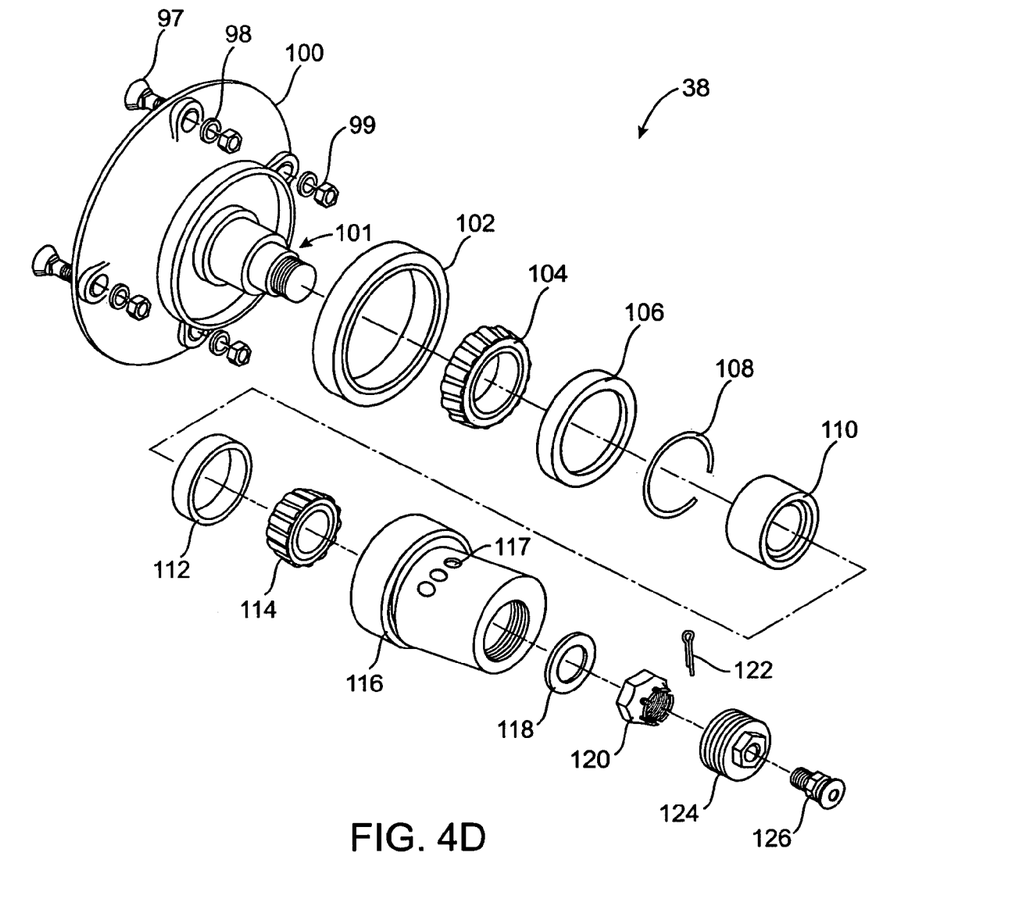
FIG. 4D is an exploded perspective view of the rotatable adjusting carrier.
Figure 4E:
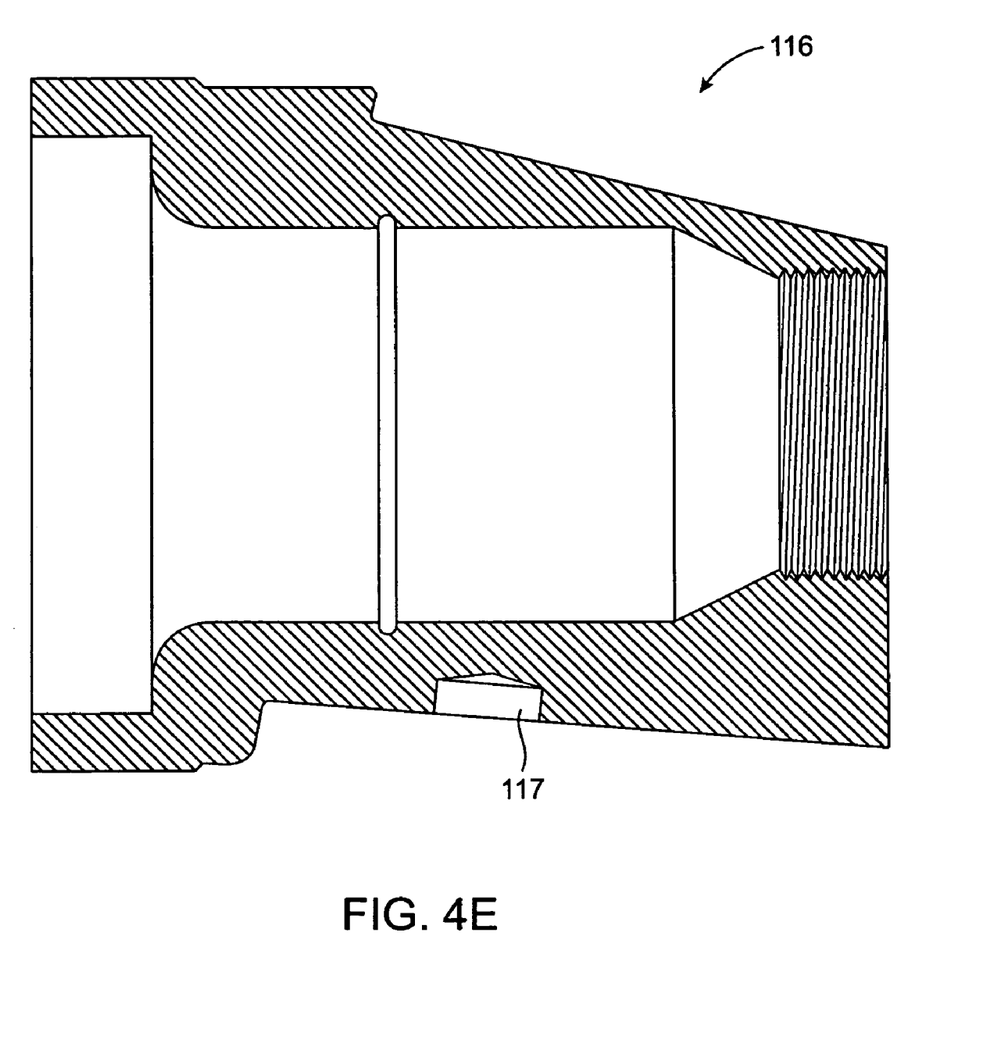
FIG. 4E is a cut-away side view of the bushing.
Figure 4F:
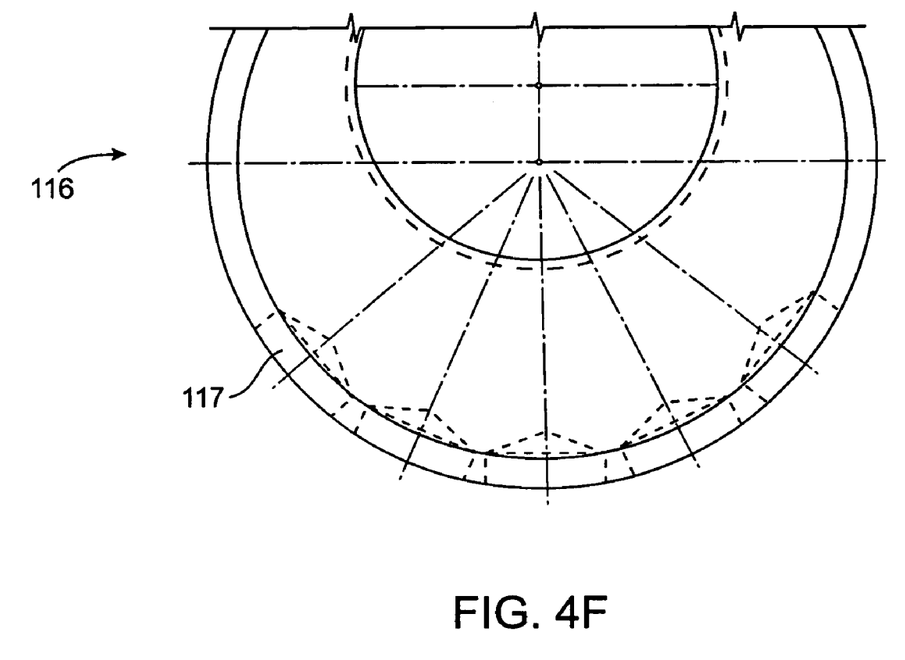
FIG. 4F is a cut-away transverse view of the bushing.

As depicted in FIGS. 4D, 4E, and 4F rotatable adjusting carrier 38 can be coupled with plow discs 39 and 40 via a plurality of plow bolts 97, plow washers 98, and plow nuts 99. Further, each carrier 38 can include a flange 100, a seal 102, a first bearing cup 104 and first bearing cone 106, a lock ring 108, a safety sleeve 110, a second bearing cup 112 and second bearing cone 114, a bushing 116 having a plurality of pockets 117, a washer 118, a slotted nut 120, a cotter pin 122, a plug 124, and a lubrication fitting 126. Rotatable adjusting carrier can be configured to include a first clearance between flange spindle 101 and safety sleeve 110, and a second clearance between bushing 116 and safety sleeve 110 such that if certain elements of carrier 38 fail, for example first bearing cup 104, first bearing cone 106, second bearing cup 112, or second bearing cone 114, then safety sleeve 110 can transfer the load from bushing 116 to flange spindle 101. This load transference can keep the flange spindle from breaking and the relocation of the force can keep the bearing components from seizing. Thus, despite a failed carrier 38, the tractor operator can continue plowing. The first clearance and second clearance can be, for example, about 5 one thousandths of an inch.

Figure 7:
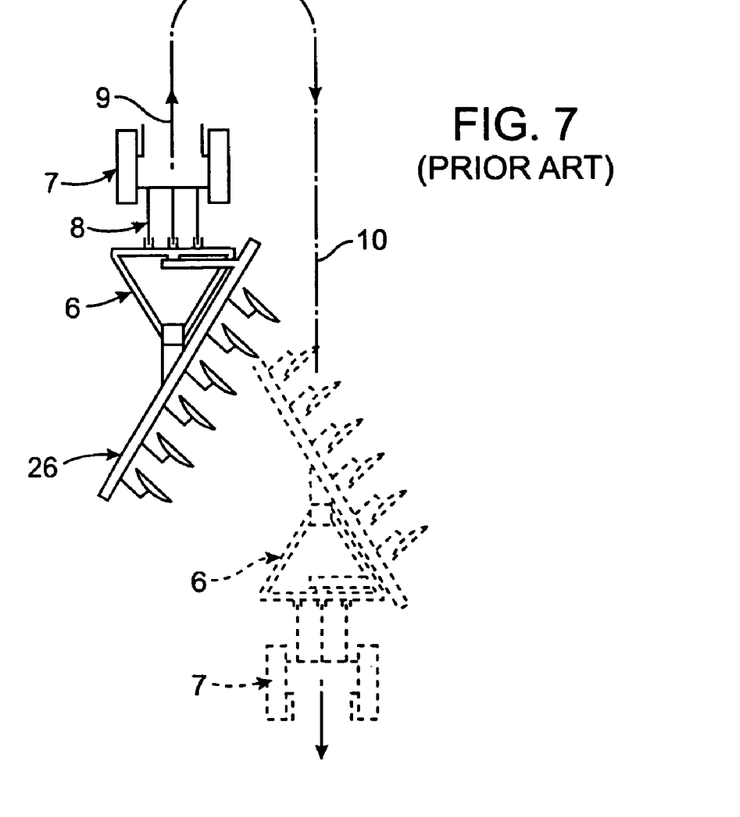
FIG. 7 is a diagram in plan showing a typical path of operation of the structure.

As shown in FIG. 7, the current device is a roll-over disc plow 6 that can be drawn behind a standard tractor 7 through the intermediacy of a standard hitch mechanism 8. The plow 6 can be drawn in an initial direction along an axis 9 to the end of a row, whereupon the tractor can make a half turn to reverse its direction and travels along a parallel axis 10 in the opposite fashion with the plow 6 being reversed during such tractor direction reverse.

Figure 8:
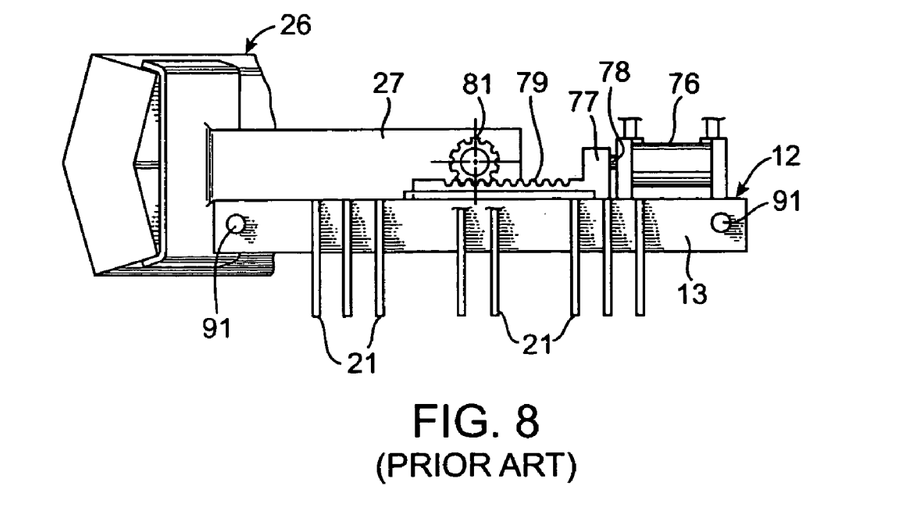
FIG. 8 is a view comparable to FIG. 2 showing in front elevation a modified form of actuating device, various portions being broken away.

As an alternative form of inverting mechanism, as shown in FIG. 8, leading beam 13 can be provided with a single, double-acting hydraulic cylinder 76. The plunger rods 73 and their associated structures and circuitry may, but need not, be eliminated. There can be a reciprocating connection 77 at one end of its piston rod 78 with a rack 79 slidable on the leading beam 13 in engagement with a pinion 81 fast on the journal pin 19, which in turn can be fast on cross beam 27. In this instance, when cylinder 76 is supplied at one end with hydraulic fluid under pressure, rack 79 can be translated and so rotates the pinion 81 and correspondingly rotate plow beam 26. When the other end of cylinder 76 is supplied with hydraulic fluid under pressure, the plow beam can be reversed in its direction of rotation, the hydraulic controls being such that the motion of plow beam 26 can be controlled.

Under many circumstances, the entire plow can be disconnected from the towing tractor. For that reason, there may be conveniently provided at the forward end of leading beam 13 a pair of manually operated screw jacks 87 and 88. These can be standard items and may be provided with fastening tubes 89 designed to telescope with fastening studs 91 on leading beam 13, being removably secured by cross pins 92. Jacks 87 and 88 are shown spaced from the plow in FIG. 3A for clarity in illustration. Jacks 87 and 88 can be adjustable in height by operation of hand cranks 93, so that when the plow is to be left unattached to the tractor, the jacks can be maneuvered to support the weight of the plow at the forward end, with the attaching pins 22 relieved of stress so that they can be easily removed and the tractor can be driven away. The plow can rest on the jacks and on the rearmost plow discs without difficulty and for an indefinite period.

Although there is shown and described certain embodiments of the invention, this invention is not limited thereto, but may be variously embodied to practice the scope of the following claims. From the foregoing description, it will be apparent that various changes may be made without departing from the spirit and scope of the invention as defined by the following claims.

What is claimed is:

1. A roll-over disc plow, the plow comprising:
   a base frame comprising a leading beam and at least one side beam;
   a plow frame comprising a plow beam and a cross beam; and
   a plurality of plow discs coupled with the plow beam, wherein the leading beam of the base frame is rotationally coupled with the cross beam of the plow frame, the at least one side beam of the base frame is rotationally coupled with the plow beam of the plow frame, and the cross beam is configured such that an adjustable gap exists between a rearward surface of the cross beam and the at least one side beam, and when the plow is under load the cross beam can rest upon the at least one side beam and flex rearwardly, the cross beam being further configured such that a close abutting relationship between the rearward surface of the cross beam and the at least one side beam occurs when the plow is subject to a predetermined plowing load.

2. The disc plow of claim 1, wherein the leading beam of the base frame is rotationally coupled with the cross beam of the plow frame via a forward journal, and the at least one side beam of the base frame is rotationally coupled with the plow beam via a rearward journal.

3. The disc plow of claim 1, the plow further comprising a rotating mechanism that rotates the plow frame about a longitudinal axis defined by the forward journal and the rearward journal.

4. The disc plow of claim 1, wherein the rotating mechanism comprises a fist hydraulic mechanism and a second hydraulic mechanism.

5. The disc plow of claim 4, wherein the first hydraulic mechanism is adapted to move the cross beam from a first operating position toward an initial rotating position.

6. The disc plow of claim 5, wherein the second hydraulic mechanism is adapted to move the cross beam from the initial rotating position toward a second operating position.

7. The disc plow of claim 6, wherein the first hydraulic mechanism comprises a first pair of hydraulic cylinders and pistons, and the second hydraulic mechanism comprises a second pair of hydraulic cylinders and pistons.

8. The disc plow of claim 7, wherein the first pair of hydraulic cylinders and pistons are substantially vertically oriented, and the second pair of hydraulic cylinders and pistons are substantially horizontally oriented.

9. The disc plow of claim 1, wherein the plurality of plow discs are coupled with the plow beam via a plurality of rotatable adjusting carriers.

10. The disc plow of claim 9, wherein each rotatable adjustable carrier comprises a flange spindle, a safety sleeve, and a bushing, such that the safety sleeve is disposed about the flange spindle and the bushing is disposed about the safety sleeve.

11. The disc plow of claim 10, wherein each rotatable adjusting carrier is configured to provide a first clearance between an outer circumference of the flange spindle and an inner circumference of the safety sleeve, and a second clearance between an outer circumference of the safety sleeve and an inner circumference of the bushing.

12. The disc plow of claim 11, wherein each rotatable adjusting carrier further comprises a first bearing assembly comprising a first bearing cup and a first bearing cone, and a second bearing assembly comprising a first bearing cup and a first bearing cone.

13. The disc plow of claim 9, wherein each rotatable adjusting carrier is coupled with the plow beam via a plow disc mounting arm and two tubes.

14. The disc plow of claim 1, wherein the plow frame is coupled with a forward apex of a triangular member of a guide frame via a bracket and with a side edge of the triangular member of the guide frame via a turnbuckle adjuster.

15. The disc plow of claim 14, wherein the turnbuckle adjuster is selectively adjustable so as to determine the orientation of a guide disc with reference to the plow frame.

16. A roll-over disc plow comprising a base frame symmetrical in plan about a longitudinal axis and including a transverse leading beam and side beams merging with the ends of said leading beam and having a convergence rearwardly, a coaxial forward journal in said leading beam, a coaxial rearward journal in said convergence, a plow frame including a plow beam extending diagonally in plan across said axis and including a cross beam adapted to flex rearwardly under load, means for mounting said plow frame in said forward journal and in said rearward journal, a plurality of plow discs arranged along and mounted on said plow beam, means interconnecting said plow frame and said base frame for rotating said plow frame about said axis and with respect to said base frame to lie in either of two extreme positions, and the cross beam and the side beams are configured such that when the plow is under load the cross beam can rest upon the side beam and flex rearwardly without laterally abutting the side beam.

17. A roll-over disc plow as in claim 16 in which said plow beam when in either of said extreme positions is substantially symmetrical with said axis and in which a substantially flat upper surface of each side beam is disposed beneath the cross beam such that the side beam does not directly laterally constrain movement of the cross beam when flexed in both of said extreme positions.

18. A roll-over disc plow as in claim 17 in which said disc plows are arranged on said plow beam in both of said extreme positions thereof with approximately half the number of said disc plows on one side of said axis and half the number of said disc plows on the other side of said axis.

19. A roll-over disc plow as in claim 16 in which said plow beam in transverse cross-section has two laterally and outwardly directed side faces defining a dihedral angle, and some of said disc plows are mounted on one of said side faces and others of said plow discs are mounted on the other of said side faces, effectively positioning said plows more nearly under said plow beam than they would be were said plow beam provided with a single vertical, side face.

20. A roll-over disc plow as in claim 16 in which said means for rotating said plow frame about said axis includes a crank pin on said plow frame adapted to rotate about said axis between two horizontally opposite extreme positions approximately one hundred eighty degrees apart, means including a pair of hydraulic cylinders and pistons for rotating said pin between said extreme positions, and expansible means including a pair of auxiliary hydraulic cylinders and piston rods on said base frame and adapted to engage said plow frame only when said crank pin is substantially in either of said two extreme positions for urging said crank pin vertically partly out of said extreme positions.

21. A roll-over disc plow as in claim 16 in which said means for rotating said plow frame about said axis includes a crank pin on said plow frame adapted to rotate about said axis between said two extreme positions, said extreme positions being approximately one hundred eighty degrees apart and said rotating means further including a hydraulic cylinder and piston mechanism connected to said base frame and said crank pin and movable into a straight locking position without crank effect, and an auxiliary hydraulic cylinder and plunger rod arrangement interposed between said base frame and said plow frame with said rod abutting said plow frame for urging said crank pin vertically partly out of one of said extreme positions.

* * * * *